US008908049B2

(12) United States Patent  
Adams et al.

(10) Patent No.: US 8,908,049 B2  
(45) Date of Patent: Dec. 9, 2014

(54) MONITORING DEVICE AND METHOD FOR MONITORING A VIDEO SESSION IN A DATA NETWORK

(71) Applicant: Huawei Technologies Co., Ltd., Shenzhen, Guangdong (CN)

(72) Inventors: Martin Adams, Wurselen (DE); Dan Jurca, Munich (DE); Renaud Cuny, Munich (DE); Sergio Beker, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/097,531

(22) Filed: Dec. 5, 2013

(65) Prior Publication Data

US 2014/0139687 A1     May 22, 2014

Related U.S. Application Data

(63) Continuation of application No. PCT/CN2011/075366, filed on Jun. 7, 2011.

(51) Int. Cl.
    *H04N 17/00*      (2006.01)
    *H04N 21/24*      (2011.01)
    *H04L 12/26*      (2006.01)

(52) U.S. Cl.
    CPC ......... *H04N 17/004* (2013.01); *H04N 21/2401* (2013.01); *H04L 43/12* (2013.01); *H04L 43/0894* (2013.01)
    USPC ........................................................ 348/192

(58) Field of Classification Search
    USPC .......... 348/192, 193, 180, 181, 175, 187, 189
    See application file for complete search history.

(56) References Cited

U.S. PATENT DOCUMENTS

| | | | | |
|---|---|---|---|---|
| 5,140,418 A | * | 8/1992 | Rivamonte | 348/185 |
| 5,506,832 A | * | 4/1996 | Arshi et al. | 370/241 |
| 5,940,124 A | * | 8/1999 | Janko et al. | 348/189 |

(Continued)

FOREIGN PATENT DOCUMENTS

| CN | 101635846 A | 1/2010 |
|---|---|---|
| CN | 102055761 A | 5/2011 |

OTHER PUBLICATIONS

"Series J: Cable Networks and Transmission of Television, Sound Programme and Other Multimedia Signals, Measurement of the quality of service; Objective perceptual multimedia video quality measurement in the presence of a full reference", ITU-T J.247, Aug. 2008, 105 pages.
Ricky . P. Mok, et al., Measuring of Quality of Experience of HTTP Video Streaming, Integrated Network Management (IM), May 23-27, 2011, pp. 485-492.
J. Welch, et al., "A Proposed Media Delivery Index (MDI)", Network Working Group, Apr. 2006, 10 pages.

(Continued)

*Primary Examiner* — Paulos M Natnael

(57) ABSTRACT

The invention relates to a monitoring device for monitoring a video session in a data network between a video server providing a video file and a video client playing the video file, comprising: a data interface configured to connect to an end-to-end communication path between the video server and the video client and configured to capture video resolution information and to retrieve client screen resolution information; and a determination unit configured to determine a quality measure for the video session based on the video resolution information, based on the client screen resolution information and based on a buffer model, the buffer model modeling a fill level of a receive buffer in the video client, the receive buffer being configured to buffer the video file before playing the video file.

19 Claims, 8 Drawing Sheets

(56) References Cited

U.S. PATENT DOCUMENTS

| | | | |
|---|---|---|---|
| 6,493,023 B1* | 12/2002 | Watson | 348/180 |
| 6,791,624 B1* | 9/2004 | Suga | 348/588 |
| 6,992,697 B2* | 1/2006 | Ali | 348/189 |
| 7,092,616 B2* | 8/2006 | Unger | 386/254 |
| 7,139,017 B2* | 11/2006 | Ali et al. | 348/192 |
| 7,683,931 B2* | 3/2010 | Pirzada et al. | 348/192 |
| 8,284,259 B2* | 10/2012 | Karacali-Akyamac | 348/180 |
| 8,395,708 B2* | 3/2013 | Lee et al. | 348/625 |
| 8,422,795 B2* | 4/2013 | Pahalawatta et al. | 382/218 |
| 8,441,955 B2* | 5/2013 | Wilkinson et al. | 370/252 |
| 8,581,987 B1* | 11/2013 | Chu et al. | 348/193 |
| 2006/0192848 A1* | 8/2006 | Ni | 348/14.08 |
| 2009/0046995 A1* | 2/2009 | Kanumuri et al. | 386/114 |
| 2011/0085605 A1 | 4/2011 | Xie et al. | |
| 2012/0013748 A1* | 1/2012 | Stanwood et al. | 348/192 |
| 2013/0169823 A1* | 7/2013 | Masuda | 348/187 |
| 2013/0215213 A1* | 8/2013 | Power et al. | 348/14.02 |
| 2013/0297743 A1* | 11/2013 | Eschet et al. | 709/219 |
| 2013/0314553 A1* | 11/2013 | Sun et al. | 348/192 |

OTHER PUBLICATIONS

Bilgehan Erman, et al., "Analysis and Realization of IPTV Service Quality", Bell Labs Technical Journal, vol. 12, No. 4, Dec. 21, 2007, p. 195-212.

Jinsul Kim, et al., "Heterogeneous Networks and Terminal-Aware QoS/QoE—Guaranteed Mobile IPTV Service"IEEE Communications Magazine, May 2008, p. 110-117.

Ali C. Begen, et at., "Watching Video over the Web, Part I: Streaming Protocols", IEEE Internet Computing, Mar. 1, 2011, p. 54-63.

A. Raake, et al., "T-V-Model: Parameter-Based Prediction of IPTV Quality", ICASSP 2008, Mar. 31, 2008, p. 1149-1152.

Xiangchun Tan, et al., "Perceived Video Streaming Quality under Initial Buffering and Rebuffering Degradations", MESAQIN Conference 2006, Jun. 5, 2006, 8 pages.

Pascal Hubbe, et al.,"An Innovative Tool for Measuring Video Streaming QoE", Jan. 12, 2011, 7 pages.

Draft Recommendation G.IPTV-PMMM "IPTV Performance monitoring—Measurement methods", IPTV-GSI event, Apr. 30-May 7, 2008, 25 pages.

* cited by examiner $$t_1 = \arg\min_{t} \left( \int_0^{t_1} r(t)dt \geq v(t) \cdot b \right)$$

$$t_2 = \arg\min_{t} \left( \int_0^{t_2} r(t)dt \leq \int_{t_1}^{t_2} v(t)dt \right)$$

$$t_3 = \arg\min_{t} \left( \int_{t_2}^{t_3} r(t)dt \geq v(t) \cdot b \right)$$

FIG. 5

$$f_2(t) = \begin{array}{ll} 0, & t <= t_1 \\ \text{Min}(D_{max}, a*\ln(b*(1+t-t_1))), & t > t_1 \end{array}$$

$f_3(x)= \text{Min}(I_{max}, c*\ln(d*(1+x)))$

MONITORING DEVICE AND METHOD FOR MONITORING A VIDEO SESSION IN A DATA NETWORK

CROSS-REFERENCE TO RELATED APPLICATIONS

This application is a continuation of International Application No. PCT/CN2011/075366, filed on Jun. 7, 2011, which is hereby incorporated by reference in its entirety.

TECHNICAL FIELD

The present invention relates to a monitoring device and a method for monitoring a video session in a data network between a video server and a video client.

BACKGROUND

Video streaming or progressive download is a popular application within the Internet. A video streaming client connected via an ISP (Internet Service Provider); e.g. a mobile or fixed operator, requests a streaming server, located somewhere within the ISP network or outside in the Internet, to send a video stream. One of the protocols that can be used is HTTP over TCP/IP. In contrast to accessing a web page or to traditional video downloading, the video client starts displaying the content of the requested file before the entire source file has been downloaded successfully by the client. Video content transmission in IP networks is affected by the transport characteristics of the underlying transmission networks, such as bandwidth, delay, jitter and packet loss. The end user perception will be impaired by initial buffering, i.e. the time from the request until the playout of the video file will start, but also from video stalling during the playout followed by rebuffering as soon as the receiver buffer in the client application has drained completely and no further content is available. This is usually the case when the provided average bandwidth by the transport network is lower than the video stream bit rate. A buffer emulator inside the monitoring system is required that calculates the buffer level and provides further information about the rebuffering characteristics.

Known video monitoring algorithms tend, however, to be complex, and require frequent deep packet inspections (DPI) on the bit stream in order to acquire the needed information about the video or they require the original video source in order to perform a comparison between monitored video and original video. Such solutions are not feasible for network monitoring probe systems, which have to analyze thousands of sessions in parallel and in real time, due to the computational capacity that such a task would require.

SUMMARY

One goal of the invention is to provide an efficient concept for monitoring a video session in a computational efficient manner which concept is suitable for being applied in monitoring simultaneously a high number of video sessions.

This goal is achieved by the features of the independent claims. Further implementation forms are apparent from the dependent claims, the description and the Figures.

The invention is based on the finding that client device's screen resolution may determine the video quality as experienced by a user, also referred to as quality of experience (QoE). Thus, an efficient concept for monitoring a video session may be provided when taking into account a dependence of the video quality experienced by a user on the screen resolution. The QoE may consider the terminal's screen resolution and correlate the terminal's screen resolution with the video resolution. The QoE may also consider a number and duration of rebufferings, which can be computed using a buffer model.

In order to describe the invention in detail, the following terms, abbreviations and notations will be used:

Buffer size b: represents the minimum amount of video information in seconds to be buffered at the client player before the video file starts to be displayed on the user device screen, r(t): represents the instantaneous network rate allocated by the transport network to the video session. Equivalent terms are: network packet rate, network rate, instantaneous network rate, session rate, instantaneous session rate, v(t): represents the rate at which the video packets must be decoded by the video player in order to ensure continuous playback of the video on the user screen. This value characterizes an encoded video stream and is set during the encoding process. Equivalent terms are: video rate, video bitrate, video playback rate, video consumption rate, DPI: deep packet inspection—is a method to inspect network packets and extract relevant information from the packet payload, QoE: Quality of Experience. Equivalent terms are: perceived user quality, video subjective quality, quality perceived by the user, Video resolution: the number of horizontal and vertical pixels of the encoded video sequence. Equivalent terms: video resolution, video resolution information, video stream resolution, base video resolution, encoded video resolution, Screen resolution: the maximum resolution of the screen of the user device defined by the number of horizontal and vertical pixels which can be displayed on the screen. Equivalent terms in this document: native device resolution, maximum screen resolution, client capability information, HTTP: Hypertext Transfer Protocol,
TCP: Transmission control Protocol,
IP: Internet Protocol,
PDCP: Packet Data Convergence Protocol,
RLC: Radio Link Control Protocol,
MAC: Medium Access Control Protocol,
OSI model: Open Systems Interconnection model,
L2: Any generic layer 2 communication protocol in the OSI model,
L1: Any generic layer 1 communication protocol in the OSI model,
KQI: Key Quality Indicator.

According to a first aspect, the invention relates to a monitoring device for monitoring a video session in a data network between a video server providing a video file and a video client playing the video file, the monitoring device comprising a data interface configured to connect to an end-to-end communication path between the video server and the video client and configured to capture video resolution information and to retrieve client screen resolution information; and a determination unit configured to determine a quality measure for the video session based on the video resolution information, based on the client screen resolution information and based on a buffer model, the buffer model modeling a fill level of a receive buffer in the video client, the receive buffer being configured to buffer the video file before playing the video file.

The video resolution information may be received by inspecting video packets sent by the video server and received by the video client. Such inspection may be performed by minimal deep packet inspections (DPI) on the bit stream of the end-to-end communication path between the video server and the video client. The information needed from the bitstream may be obtained by DPI on a few packets, for example, the first few packets or other few packets during the video transmission, of the video file transmitted. Therefore, also the scalability may be improved. Moreover, also an implementation in network based monitoring probe systems is feasible. In addition, a number of sessions which can be analysed in parallel and real time may be increased.

According to a particular implementation form, the algorithm for calculating the QoE is based on:

1.) Assessing the base video quality by capturing the video resolution information included in the video metadata of the first video packets;
2.) Gathering information about the end-user's device screen resolution, i.e. which is extracted by analysing the device capability message;
3.) Considering the number of stalling events per streaming session, using a buffer model; and
4.) Considering the rebuffering duration per stall, e.g. video freeze, event.

The quality of experience, or in other words the user perceived quality of the video, is computed based on information which can be obtained at network level by devices connected to the end-to-end communication path between the video client and the video server. The result of the computation can be a scalar value which represents the quality measure for a given video session. This scalar value represents the effect of the video resolution, display screen resolution and network effect on the video session, as perceived by the user watching a video on its device display.

The monitoring devices can for example be able to monitor the end-to-end session at TCP level, and can be placed on any network segment in the communication path, including the end devices.

Implementation forms of the first aspect may reduce the computational effort in the monitoring devices. Hence, it can provide the operator with a broader base of measurements and consequently with a better understanding of the end-users' perceived quality. These forms allow the operator to perform monitoring of multiple video sessions in parallel with reduced infrastructure needs, e.g., without adding more monitoring devices.

The data network can for example be a network used for transmission in wireless networks, in particular in GSM/UMTS/LTE cellular networks and WLAN. According to an alternative implementation form, the data network is a network used for transmission in wired networks, operating in a circuit-switched or packet-switched manner. According to an implementation form, the data network is IP-based, ATM-based or TDM-based. According to an implementation form, the data network is an XDSL network. According to an implementation form, the data network is an optical data network. According to an implementation form, the data network is an electrical data network. According to an implementation form, the data network provides optical and electrical transmission.

In a first possible implementation form of the monitoring device according to the first aspect, the data interface comprises a first interface unit, in particular a probe, for capturing the video resolution information, and a second interface unit for retrieving the client display resolution information from a network node, in particular a Home Subscriber Server, or a Mobility Management Entity, or a Equipment Identity Register, over a communication network. In this implementation, the monitoring device can put together both pieces of information such as video resolution and client screen resolution information, and match them together in order to compute a matching factor.

In a second possible implementation form of the monitoring device according to the first aspect as such or according to the first implementation form of the first aspect, the data interface is configured to capture the video resolution information from a video file meta data which are associated with the video file. This requires minimal DPI on the video packets traversing the network, only on specific video packets usually found at the beginning of the video file.

In a third possible implementation form of the monitoring device according to the first aspect as such or according to any of the first or second implementation forms of the first aspect, the client screen resolution information indicates a maximum resolution of a display of the video client, also referred to as native resolution of the display of the video client, and wherein the video resolution information indicates an encoding resolution of the video file.

The encoding resolution of the video file can be the resolution of the video file or video pictures or frames of the video file were source encoded and can be provided as the number of pixels in horizontal and the number of pixels in vertical direction of the video pictures or frames.

The client display resolution, or native resolution of the display of the video client, may also be provided as the number of pixels in horizontal and the number of pixels in vertical direction of the display.

In a fourth possible implementation form of the monitoring device according to the first aspect as such or according to any of the preceding implementation forms of the first aspect, the quality measure depends on a Video Quality Matching Factor (KQI1) which is determined as a correlation of the video resolution of the video file and the display resolution of the video client included in the client capabilities information. The higher the correlation between the two values is, the better is the computed matching factor (KQI1).

In a fifth possible implementation form of the monitoring device according to the first aspect as such or according to any of the preceding implementation forms of the first aspect, the quality measure depends on a Session Normalized Play Time (KQI2) which is determined as a total play time of the active video session normalized by a duration of the video session. The closer KQI2 is to 1, the higher is the computed quality measure.

In a sixth possible implementation form of the monitoring device according to the first aspect as such or according to any of the preceding implementation forms of the first aspect, the quality measure depends on a Session Stall Duration Degradation Factor (KQI3) which is determined as a function of an average stall duration of the video session, using the buffer model to determine the stall duration of the video session and a frequency of occurrence of the stalls of the video session. The longer the stall duration is, and the higher the frequency of stall occurrence is, the lower is the computed quality measure.

In a seventh possible implementation form of the monitoring device according to the first aspect as such or according to any of the preceding implementation forms of the first aspect, the quality measure depends on a Session Normalized Total Stall Time (KQI4) which is determined as a cumulated time of stalls of the video session normalized by a duration of the video session. The closer KQI4 is to 0, the higher is the computed quality measure.

In an eighth possible implementation form of the monitoring device according to the first aspect as such or according to any of the preceding implementation forms of the first aspect, the quality measure depends on a Session Number of Stalls Degradation Factor (KQI5) which is determined as a function of an average number of stalls during the video session. The higher KQI5 value is, the lower is the computed quality measure.

In a ninth possible implementation form of the monitoring device according to the first aspect as such or according to any of the preceding implementation forms of the first aspect, the quality measure QoE depends on a formula $$QoE=\max(QoEmin, KQI1*KQI2-KQI3*KQI4*KQI5),$$

where QoEmin is a minimum limit of the quality measure, KQI1 is the Video Quality Matching Factor, KQI2 is the Session Normalized Play Time, KQI3 is the Session Stall Duration Degradation Factor, KQI4 is the Session Normalized Total Stall Time and KQI5 is the Session Number of Stalls Degradation Factor. The determination of KQI1, KQI2, KQI3, KQI4 and KQI5 is performed according to the tables 1 to 4 as described below with respect to FIGS. 7 and 8. The operator "max" and the QoEmin value may be omitted according to some implementation forms.

In a tenth possible implementation form of the monitoring device according to the first aspect and according to any of the preceding implementation forms five to nine of the first aspect, the buffer model depends on an instantaneous network rate r(t) computed by following messages between the video client and the video server and wherein the buffer model depends on a video rate v(t) captured from the video meta data information contained in some of the packets of the transmitted video file, in particular first packets of the video file. With the help of r(t) and v(t), the buffer model can estimate the number and the duration of stalls in the video session.

In a eleventh possible implementation form of the monitoring device according to the first aspect as such or according to any of the preceding implementation forms of the first aspect the data interface is configured to retrieve the client screen resolution by signalling through a data network or by correlating device screen resolution information available in network management systems and databases of the data network.

In a twelfth possible implementation form of the monitoring device according to the first aspect as such or according to any of the preceding implementation forms of the first aspect, the determination unit is configured to determine one quality measure for a group of video sessions representing an average quality for the group of video sessions. This implementation provides average quality measures for predefined groups of sessions, such that the operator can monitor various segments of its network and user groups.

The quality measure can for example be one scalar measure representing this average quality measure of the group of sessions under consideration. According to some embodiments, a segment in the network is related to all gold users of a network operator, or for a specific geographical region, or for a given user terminal type, or for a specific time duration.

In a thirteenth possible implementation form of the monitoring device according to the first aspect as such or according to any of the preceding implementation forms of the first aspect, the group of video sessions comprises video sessions between one video server and multiple video clients, multiple video sessions between one video server and one video client, and video sessions between multiple video servers and multiple video clients.

In a fourteenth possible implementation form of the monitoring device according to the first aspect and the thirteenth implementation form of the first aspect, the data network is a TCP/IP network and the data interface is configured to connect to the TCP layer of the TCP/IP network.

In a fifteenth possible implementation form of the monitoring device according to the first aspect as such or according to any of the preceding implementation forms of the first aspect, the data interface is an element of a video server, of the video client, of an intermediate network node, or of an additional intermediate network node placed in the end-to-end communication path of the data network.

According to a second aspect, the invention relates to a method for monitoring a video session in a data network between a video server providing a video file and a video client playing the video file, comprising: connecting to an end-to-end communication path between the video server and the video client and capturing video resolution information and client screen resolution information; and determining a quality measure for the video session based on the video resolution information, based on the screen resolution information and based on a buffer model, the buffer model modeling a fill level of a receive buffer in the video client, the receive buffer being configured to buffer the video file before playing the video file, i.e. before playback.

According to a third aspect, the invention is related to a computer program product for monitoring a video session in a data network between a video server providing a video file and a video client playing the video file, comprising a data interface configured to connect to an end-to-end communication path between the video server and the video client and configured to capture video resolution information and client display resolution information; and a software module configured to determine a quality measure for the video session based on the video resolution information, based on the client display resolution information and based on a buffer model, the buffer model modeling a fill level of a receive buffer in the video client, the receive buffer being configured to buffer the video file before playing the video file, i.e. before playback.

In an implementation form of the third aspect, the computer program product is configured to run as terminal agent software in an end user device or as a network probe on a network interface.

According to a fourth aspect, the invention is related to an IP network traffic monitoring and analysis system, especially a system analysing the QoE of Video streaming traffic.

In a first implementation form of the fourth aspect, the system is a passive monitoring system for HTTP video streaming services, which utilizes a buffer model and captured information from the video stream in order to compute some quality indicators for the session, as perceived by the client where:
 the computation algorithm takes as input relevant video session information like device screen resolution and video resolution and calculates KQI1,
 the computation algorithm takes as input relevant video playtime information during the session and calculates KQI2,
 the computation algorithm takes as input relevant video stall information during the session provided by a buffer model, such as duration and frequency and calculates KQI3, KQI4 and KQI5,
 the computation algorithm reports the obtained quality indicator for the session, i.e. QoE(session), using KQI1-5. The computation of KQI1-5 is described below.

In an implementation form of the fourth aspect as such or according to any of the preceding implementation forms of the fourth aspect, the system is a passive monitoring system for HTTP video streaming services, which utilizes a buffer model and captured information from the video stream in order to compute some quality indicators for a particular segment of sessions, as perceived by the client where:

the computation algorithm takes as input relevant video session information like device screen resolution and video resolution and calculates KQI6 for a particular segment, the computation algorithm takes as input relevant video playtime information during the session and calculates KQI7 for a particular segment, the computation algorithm takes as input relevant video stall information during the session provided by a buffer model, such as duration and frequency, and calculates KQI8, KQI9 and KQI10 for a particular segment, the computation algorithm reports the obtained quality indicator for a segment, i.e. QoE(session), using KQI6-10. The computation of KQI6-10 is described below in more detail.

In a third implementation form of the fourth aspect as such or according to any of the preceding implementation forms of the fourth aspect, the system computes some quality indicators for both a video session and a particular segment of video sessions.

According to some implementation forms, the computation algorithm correlate with device screen resolution and video resolution for a session in order to estimate the base quality of the video stream without further additional DPI.

According to some implementation forms, the stalling duration of the video stream is averaged over the session duration.

According to some implementation forms, the number of stalling events is averaged over the session duration.

According to further implementation forms, the number of stalling events is averaged over a given time interval.

According to some implementation forms, the computation algorithm correlate with device screen resolution and video resolution for the segment, the segment being formed by a group of sessions, in order to estimate the average base quality of the video sessions in the segment without further additional DPI.

According to some implementation forms, the average stalling duration in the segment is normalized by the average session duration for this segment.

According to some implementation forms, the segment's average number of stalling events is normalized by the number of sessions belonging to this segment.

The monitoring system can for example be applied to fixed or mobile networks.

The monitoring system can for example be deployed as a terminal agent software, in the end user device, or as a network probe on a network interface.

The invention can be implemented in digital electronic circuitry, or in computer hardware, firmware, software, or in combinations thereof.

BRIEF DESCRIPTION OF DRAWINGS

Further embodiments of the invention will be described with respect to the following Figures, in which:

FIG. 5 shows an equation system for calculating a performance for a buffer model as depicted in FIG. 3 according to an implementation form;

DESCRIPTION OF EMBODIMENTS

Figure 1:
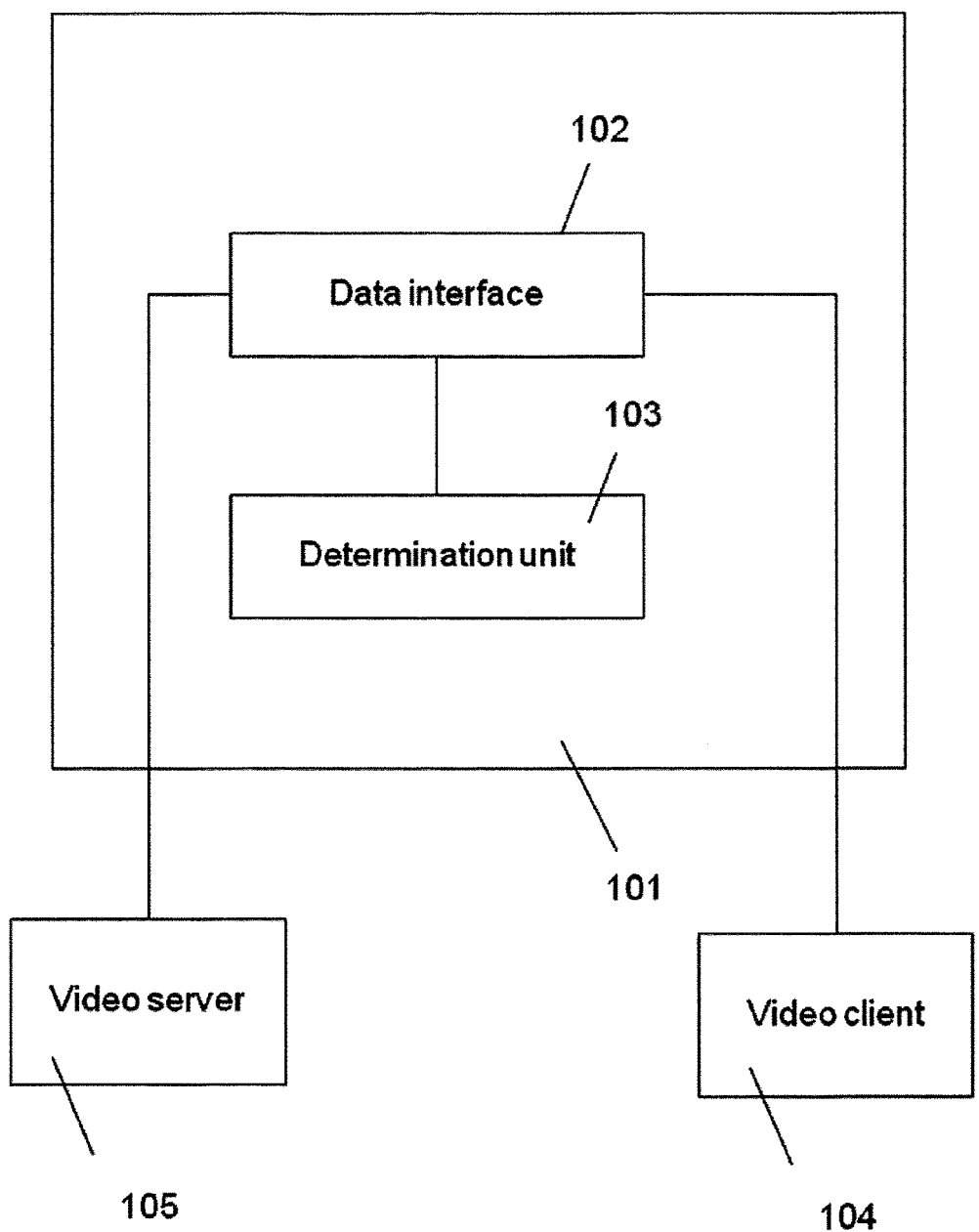
FIG. 1 shows a block diagram of a monitoring device according to an implementation form.

FIG. 1 shows a block diagram of a monitoring device according to an implementation form. The monitoring device 101 comprises a data interface 102 and a determination unit 103. The data interface is connected to an end-to-end communication path between the video server 105 and the video client 104 and is configured to capture video resolution information and retrieve client display resolution information. The determination unit 103 is configured to determine a quality measure for the video session based on the video resolution information and the client display resolution information and based on a buffer model, the buffer model modeling a fill level of the receive buffer in the video client 104, the receive buffer is buffering the video file before playback. The video client 104 is implemented in a user equipment (UE) which processes the protocol stack HTTP/TCP/IP/PDCP/RLC/MAC/L1. The video server 105 is implemented at a service provider location within the Internet and implements the protocol stack HTTP/TCP/IP/L2/L1. The protocol stack is an example for a user connected to an LTE/EPC network. Other networks and protocol stacks can be envisioned. The data interface 102 connects to the end-to-end communication path at the TCP layer in order to capture the video resolution information from the video server 105 and to retrieve the client display resolution information from the video client 104.

Figure 2:
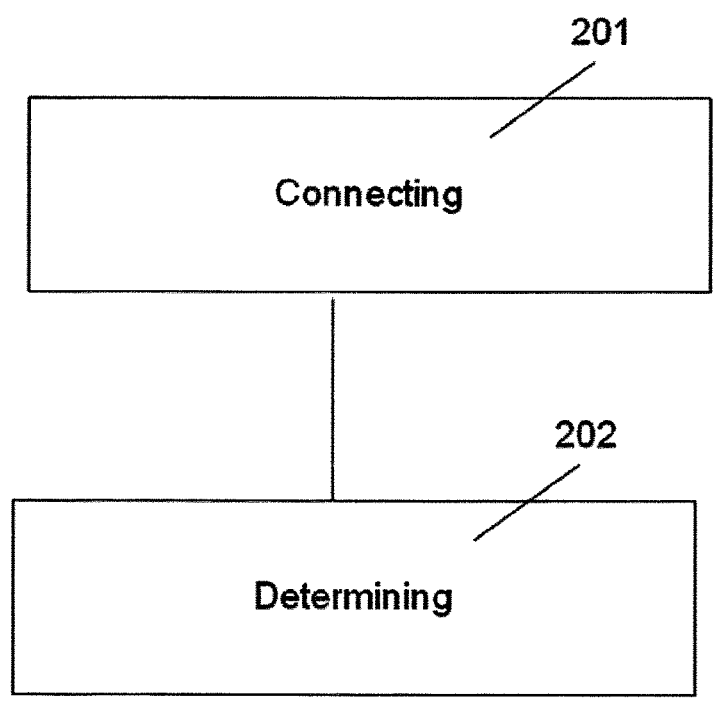
FIG. 2 shows a block diagram of a method for monitoring a video session in a data network between a video server providing a video file and a video client playing the video file according to an implementation form.

FIG. 2 shows a block diagram of a method for monitoring a video session in a data network between a video server providing a video file and a video client playing the video file according to an implementation form. The method comprises connecting 201 to end-to-end communication path between video server and video client and capturing video resolution information and client display resolution information. The method comprises determining 202 a quality measure for the video session based on the video resolution information and the client display resolution information and based on a buffer model, the buffer model modeling a fill level of a receive buffer in the video client, the receive buffer is buffering the video file before playing the video file.

Figure 3:
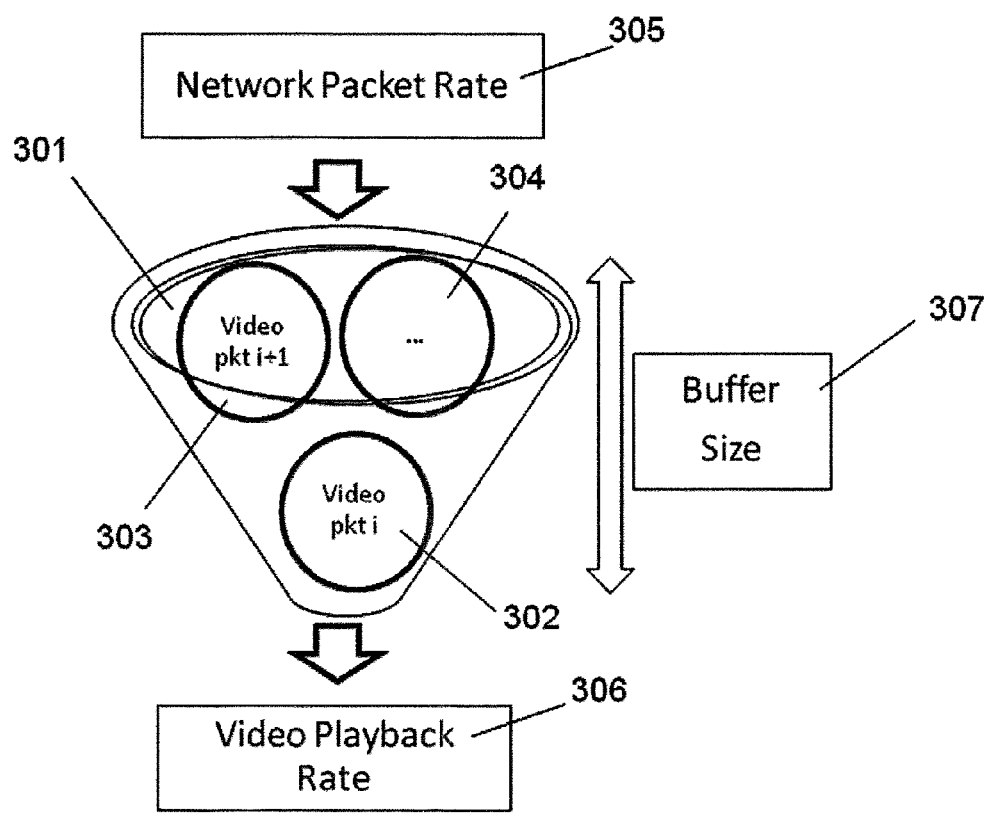
FIG. 3 shows a diagram of a buffer model according to an implementation form.

FIG. 3 shows a diagram of a buffer model according to an implementation form. A buffer 301 is configured to buffer multiple video packets, wherein FIG. 3 depicts a first video packet 302 no. i, a second video packet 303 no. i+1 and further video packets 304. The buffer 301 has a buffer size b 307 which corresponds to a size of the buffer 301 representing a number of memory cells for storing video packets or representing a minimum buffered duration or minimum buffered play back duration, for example in seconds, of the video file that needs to be buffered in the buffer before the buffered portion of the video file is played. Video packets are received by the network with an instantaneous network rate r(t) 305 and each video packet is provided to a video playback unit for playing the video with a video rate v(t) 306. Depending on the instantaneous network rate 305 the buffer 301 is filled with video packets 302, 303, 304 until the buffer size b 307 in the video client is reached. When the buffer is filled to the buffer size b, the video client starts playing the video at the video rate 306. If the instantaneous network rate 305 is greater than the video rate 306, the buffer 301 is filled with video packets 302, 303, 304. If the video rate 306 is greater than the instantaneous network rate 305, the buffer 301 drains and eventually can become empty, causing the video to stall on the client display. The buffer size b may form a minimum constraint on how much should be buffered before video starts playback or restarts playback after a freeze. If the buffer size b is already filled with packets, then the client can still store network packets as they arrive according to the instantaneous network rate, hence increasing the amount of packets that are available in the buffer. The buffer size b may be assumed as an input parameter.

The video resolution, v(t) and r(t) are related to the end-to-end communication path. The display screen resolution forming an implementation of a client's capability may be retrieved from other interfaces and network nodes or databases. The parameter r(t) is the instantaneous network rate and can be obtained by observing and monitoring the packets of the video session. The parameter v(t) is the video rate, i.e. the bitrate, and can be obtained by DPI on the first packets of the video session. The parameter v(t) is included in the video metadata in some packets of the video file containing the video.

Figure 4:
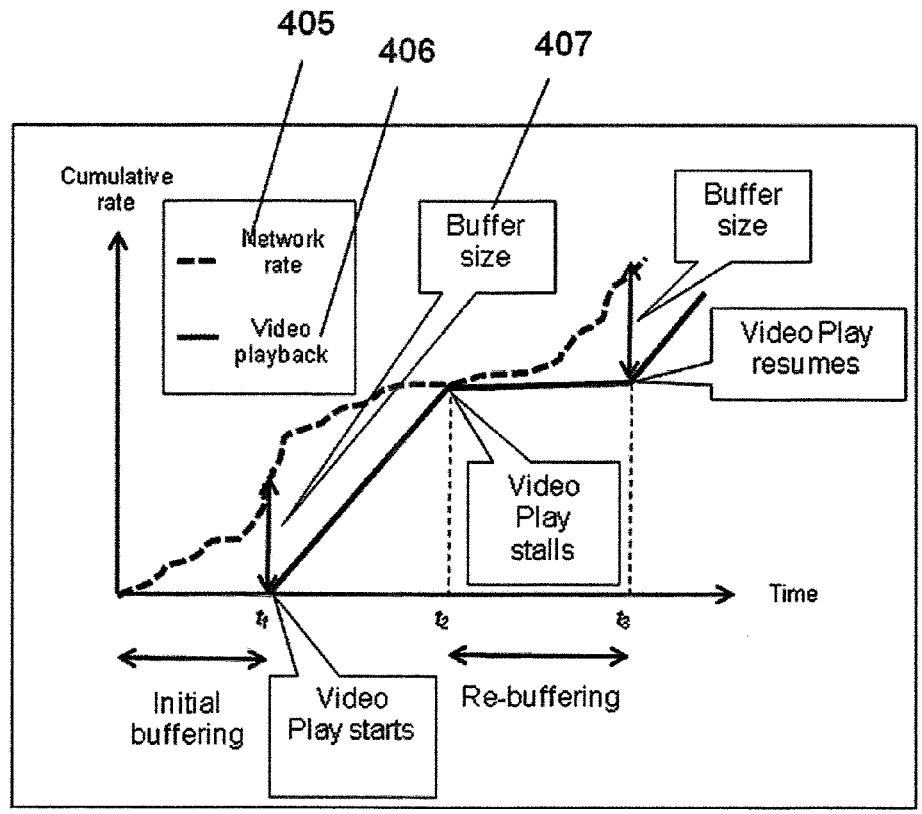
FIG. 4 shows a performance diagram of a buffer model as depicted in FIG. 3 according to an implementation form.

FIG. 4 shows a diagram illustrating loading and unloading of the buffer 301 according to an implementation form.

According to an implementation form, the buffer 301 does not have an upper limit. So even if the network rate is higher than the video rate, packets can still be loaded and stored in an ever increasing buffer. The buffer size b may represent the minimum amount of data that must be downloaded in order for the video playback to start.

The buffer emulator or buffer model inside the monitoring device is a crucial computational element, which can assess the influence of the network status on the transmission process for the packets belonging to the video session. The input parameters for the buffer emulator or buffer model are the buffer size b, the instantaneous network rate provided to the video session, and the video rate or bitrate of the video file as can be seen from FIG. 3. The internal computations of the emulator can predict based on these parameters: i) the initial buffering time, before the player starts displaying the video information, ii) the times at which the video freezes on the screen due to buffer underflow and iii) the time it takes to refill the buffer and resume playback.

FIG. 4 shows a performance diagram of a buffer model as depicted in FIG. 3 according to an implementation form. The dotted line represents the incoming rate of the video packets according to the instantaneous network rate. The continuous line represents the consumption of the video information by the player at video rate, and the corresponding display of video information on the user screen. Time t1 represents the initial buffering time, during which the player buffer gets filled to level b, before the video starts displaying. Time t2 represents the time when buffer underflow occurs. The video playback is stopped, and the player attempts to refill the buffer to level b, before restarting displaying the video. The buffer gets refilled at time t3, and the video is continued on the user screen. In the interval between t2 and t3 the user experiences a video freeze on the screen.

The diagram illustrates two data rates, a first data rate is the instantaneous network rate 405 illustrated by the dotted line and a second data rate is the video rate 406 illustrated by the continuous line. The instantaneous network rate 405, r(t) can be captured by following messages between the video client and the video server and the video rate 406, v(t) can be captured from first packets of the video file. During a first time interval from 0 to t1 of initial buffering, the buffer is filled with video packets at the instantaneous network rate 405. During this time interval there is no playback of video in the video client. At time t1 the buffer is filled with video packets up to the buffer size b 407 and the video client starts playback. During a second time interval t1 to t2, the continuous line 406 illustrates continuous playing of the video on the user screen at the video rate. During this time interval, data packets are received from the network at the instantaneous network rate 405. However, as can be seen from the Figure, the instantaneous network rate 405 is smaller than the video rate 406, resulting in a drain of the buffer, such that at time t2 the buffer is empty and no more packets are available for playback. Thus, at time t2 video play stalls. The buffer has to be filled again at the third time interval from time t2 to time t3, in which time interval the video is not played by the video client. At time t3 enough video packets were delivered by the network at the instantaneous network rate to fill the buffer up to the buffer size 407. Then, the video client resumes playing the video.

As can be seen from the Figure, the video is played continuously by the video client, if the network rate 405 is greater than the video playback rate 406. If the network rate 405, however, is smaller than the video rate, the buffer is draining until it gets empty and video play stalls. A buffer model for the buffer according to an implementation form is presented in FIG. 5.

According to some embodiments, the computation of times t1, t2 and t3 is performed according to the leaky bucket principle, and is displayed in FIG. 5.

FIG. 5 shows an equation system for calculating a performance for a buffer model as depicted in FIG. 3 according to an implementation form.

As aforementioned, the parameter r(t) is the instantaneous network rate and can be obtained by observing and monitoring the packets of the session server. The parameter v(t) is the video rate, i.e. bitrate, and can be obtained by DPI on the first packets of the video session. The parameter v(t) is included in the video metadata in the first packets of the video file containing the video, b is the buffer size, taken as input parameter or obtained by evaluating the client capabilities information received from the client application on the video client. Based on this model and computation, the monitoring device is able to predict the number of times the user player had to rebuffer, and the duration of these rebuffering intervals in order to assess the user's quality of experience.

The buffer model models the buffer 301 which fill level is depicted in FIG. 4. Time t1 which is required for filling the buffer is calculated by using the minimum argument with respect to time t, for which the integral of r(t) integrated from 0 to t1 is greater than the product of v(t) and b, wherein r(t) is the instantaneous network rate, v(t) is the video rate and b is the buffer size. Parameter r(t) corresponds to the instantaneous network rate 405 of FIG. 4, v(t) corresponds to the video rate 406 of FIG. 4 and b corresponds to the buffer size 407 of FIG. 4. Time t2 is calculated by using the minimum argument with respect to time t, for which the integral of r(t) integrated from 0 to tt2 is smaller than the integral of v(t) integrated from t2 to t2. Refilling of the buffer at the instantaneous network rate during the time interval from t2 to t3 is calculated by the third equation. Time $t_3$ is calculated by using the minimum argument with respect to time t, for which the integral of r(t) integrated from t2 to t2 is greater than the product of v(t) and b. During the third time interval, the buffer is refilled at the instantaneous network rate r(t) until the buffer size b is reached.

Figure 6:
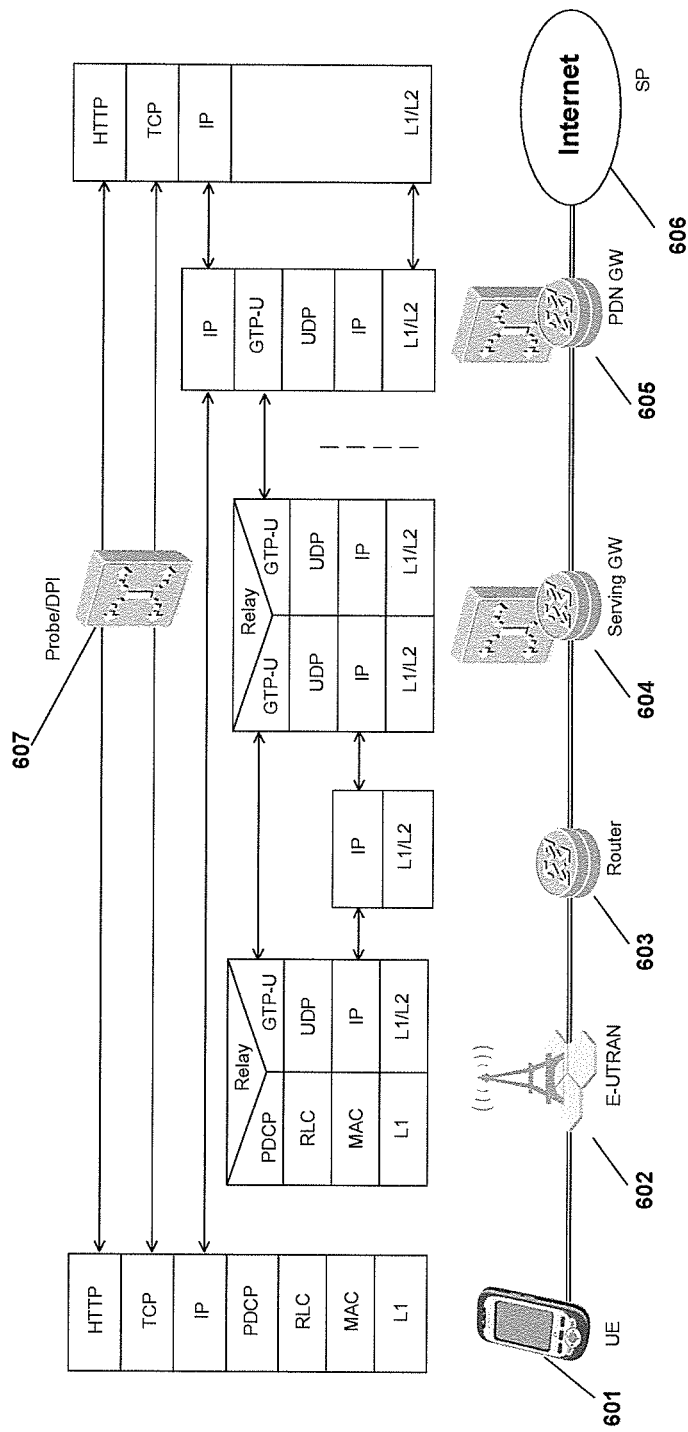
FIG. 6 shows a block diagram of an end-to-end communication path including a monitoring device according to an implementation form.

FIG. 6 shows a block diagram of an end-to-end communication path including a monitoring device according to an implementation form. In particular, FIG. 6 depicts just an example of the protocol stack of a type of communication network (LTE/EPC mobile network). However, it shall be noted that the aspects and implementation forms described herein also apply to other networks as well.

The monitoring device 607 is placed between a video server of a service provider 606 and a video client 601. The video server of a service provider 606 is implemented within a service provider in the Internet and implements the protocol stack HTTP over TCP over IP over L1/L2, wherein the video client is implemented within a user equipment 601 implementing the protocol stack HTTP over TCP over IP over PDCP over RLC over MAC over L1. The monitoring device 607 is placed at the end-to-end communication path between the video server and the video client and has contact to the TCP layers of video server and video client as well as to the HTTP layers. In the end-to-end communication path, there are a lot of intermediate network nodes, which may include an E-UTRAN device 602, a router 603, a serving gateway 604 and a packet data network (PDN) gateway 605. The E-UTRAN device 602 implements the protocol stack PDCP over RLC over MAC over L1 when connecting to the user equipment 601 and the protocol stack GTP-U over UDP over IP over L1/L2 when connecting to the router 603. Both connections are relayed by a relay. The router 603 implements the protocol stack IP over L1/L2 and connects to the E-UTRAN device 602 and the serving gateway 604. The serving gateway 604 implements the protocol stack GTP-U over UDP over IP over L1/L2 when connecting to the E-UTRAN device 602 and the PDN gateway 605, both connections relayed by a relay. The IP stack of the serving gateway 604 has connection to the IP stack of the router 603. The packet data network gateway 605 implements the protocol stack IP over GTP-U over UDP over IP over L1/L2, wherein its upper layer IP stack is in connection with the IP stack of the service provider 606 and with the IP stack of the user equipment 601. Besides, its L1/L2 stack is in connection with the L1/L2 stack of the service provider 606. According to this implementation form, the monitoring device 607 is a network probe (DPI) which is placed between the video server of the service provider 606 and the video client 601.

According to some implementation forms, the monitoring device can be implemented in each of the network nodes depicted in FIG. 6, i.e. in the E-UTRAN 602, in the router 603, in the serving gateway 604 and in the packet data network gateway 605.

According to some implementation forms, the monitoring device 607 is implemented in the video server of the service provider 606 and/or in the user equipment 601.

According to some implementation forms, the monitoring device 607 is configured to capture video resolution information from the video server of the service provider 606 and configured to capture client display resolution information from the user equipment or the video client, respectively.

According to some implementation forms, the user equipment implements this protocol stack only for the LTE/EPC network in FIG. 6. Other protocol stacks related to other communication networks can be envisioned too, e.g., a laptop connected to a fixed network will have a protocol stack HTTP/TCP/IP/L2/L1, where L1 and L2 are layer 1 and layer 2 protocols and are abstracted by the TCP/IP communication paradigm. L1 and L2 can be any protocol for Layer 1 and Layer 2 communication according to the OSI model.

According to an implementation form, the monitoring device is a Network Monitoring Probe placed at TCP/HTTP level to monitor a HTTP video streaming session. According to an implementation form, the end-to-end communication path is between the video server and a mobile client accessing an LTE network. The monitoring device/network probe accesses the TCP layer and can be placed anywhere in the communication path, including the end devices.

TCP provides a communication service at an intermediate level between an application program and the Internet Protocol (IP). That is, when an application program, e.g. the video client desires to send a large chunk of data across the Internet using IP, instead of breaking the data into IP-sized pieces and issuing a series of IP requests, the software can issue a single request to TCP and let TCP handle the IP details.

IP works by exchanging pieces of information called packets. A packet is a sequence of octets and consists of a header followed by a body. The header describes the packet's destination and, optionally, the routers to use for forwarding until it arrives at its destination. The body contains the data IP is transmitting.

Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of the other problems. Once the TCP receiver has reassembled the sequence of octets originally transmitted, it passes them to the application program. Thus, TCP abstracts the application's communication from the underlying networking details. Therefore, data interfaces of monitoring devices according to implementation forms can connect to the TCP layer without caring about transmission in lower protocol layers.

TCP is optimized for accurate delivery rather than timely delivery, and therefore, TCP sometimes incurs relatively long delays in the order of seconds while waiting for out-of-order messages or retransmissions of lost messages. It is not particularly suitable for real-time applications such as Voice over IP. For such applications, protocols like the Real-time Transport Protocol (RTP) running over the User Datagram Protocol (UDP) are usually recommended instead. Data interfaces of monitoring devices according to alternative implementation forms connect to the UDP layer or the RTP layer. Thus, they can be applied for Voice over IP applications.

According to some implementation forms, the monitoring device is used for HTTP video streaming monitoring systems using the HTTP layer. The Hypertext Transfer Protocol (HTTP) is a networking protocol for distributed, collaborative, hype media information systems. HTTP is the foundation of data communication for the World Wide Web. According to an implementation form, RFC 2616, which defines HTTP/1.1, is used as version of the HTTP protocol.

HTTP is an Application Layer protocol designed within the framework of the Internet Protocol Suite. The protocol definitions presume a reliable Transport Layer protocol for host-to-host data transfer. The Transmission Control Protocol (TCP) is the dominant protocol in use for this purpose. According to implementation forms, the data interface of the monitoring device is configured to connect to an end-to-end communication path at TCP layer between the video server and the video client. However, HTTP has found application even with unreliable protocols, such as the User Datagram Protocol (UDP) in methods such as the Simple Service Discovery Protocol (SSDP). According to implementation forms, the data interface of the monitoring device is configured to connect to an end-to-end communication path at UDP layer between the video server and the video client.

HTTP/1.1 can reuse a connection multiple times, to download, for instance, images for a just delivered page. According to implementation forms, the data interface of the monitoring device is configured to connect to an end-to-end communication path at HTTP layer between the video server and the video client in order to reuse connections multiple times. Hence monitoring devices according to implementation forms experience less latency as the establishment of TCP connections presents considerable overhead.

HTTP functions as a request-response protocol in the client-server computing model. In HTTP, a web browser, for example, acts as the video client according to implementation forms of the first aspect, while an application running on a computer hosting a web site functions as a video server according to implementation forms of the first aspect. The video client submits an HTTP request message to the video server. The video server, which stores content, or provides resources, such as HTML files, or performs other functions on behalf of the video client, returns a response message to the video client. A response contains completion status information about the request and may contain any content requested by the video client in its message body. According to some implementation forms, the video client is referred to as a user agent (UA) or as a web browser or web crawler.

The HTTP protocol is designed to permit intermediate network elements to improve or enable communications between clients and servers. According to implementation forms, the monitoring device is placed in the client or in the server or in any of the intermediate network elements. High-traffic websites often benefit from web cache servers that deliver content on behalf of the original, so-called origin server to improve response time. According to implementation forms, the monitoring device is placed in an origin server. HTTP proxy servers at network boundaries facilitate communication when clients without a globally routable address are located in private networks by relaying the requests and responses between clients and servers. According to implementation forms, the monitoring device is placed in a HTTP proxy server.

According to the ninth implementation form of the first aspect, the Quality of Experience (QoE) estimation per session calculates as follows.

$$QoE(session)=\max(QoE_{min}, KQI1*KQI2-KQI3*KQI4*KQI5),$$

where the KQIs (Key Quality Indicators) are defined as: KQI1=Video Quality Matching Factor ($f1(r_i)$), KQI2=Session Normalized Play Time, KQI3=Session Stall Duration Degradation Factor ($f_2(t)$), KQI4=Session Normalized Total Stall Time and KQI5=Session Number of Stalls Degradation Factor ($f_3(x)$).

The introduced formula computes a quality assessment metric for the user perceived quality of a video session, incorporating three main factors. First, the match between the video resolution and the screen resolution (KQI1) may be accounted for. The closer the video resolution to the screen resolution is, the higher the perceived user quality is achieved. Then the total duration that the user perceives as stall time during video playback (KQI3) is accounted for, wherein a decreasing stall time increases the video quality perceived by the user. Finally, the number of stalling events during the video playback (KQI5) is accounted for. The smaller the number of times the video stalls during playback, the higher the perceived quality of the video by the end user. The factors are multiplied by the percentage of time that the user spends in playback mode (KQI2) and stall mode (KQI4) from the total session time. The longer the time spent in playback mode, and the shorter the time spent in stall mode, the higher the perceived user quality.

The parameter KQI1, the Video Quality Matching Factor $f1(r_i)$ uses screen and video resolutions as input parameters for the base quality calculation function. Such KQI requires information about the video resolution for that session, which can be obtained through Deep Packet Inspection (DPI) on the initial packets of the video file, those containing the video metadata. It also requires information about the user screen resolution, which can be obtained through correlation with Device Capabilities Information available in other network management systems and databases or through signaling through the network. This KQI1 measures the matching between the video resolution and the screen resolution. The video resolution on the user screen cannot be larger than the screen resolution. Even if the video resolution is larger than the screen resolution, the play engine in the client video player will down scale the video resolution to match the screen resolution. In implementation forms, the Device Capabilities Information containing the screen resolution information is available in a HSS—Home Subscriber System or in a MME—Mobility Management Entity. In implementation forms, the respective signaling is performed through a mobile network or any other network, and may be a different network compared to the network comprising the end-to-end communication path between the video server and the video client.

TABLE 1

KQI1 computation

| Screen resolution (KQI21) | Video resolution (KQI22) | | | | |
|---|---|---|---|---|---|
| | 640 × 480 | 480 × 360 | 320 × 240 | 176 × 144 | 120 × 90 |
| iPad (1024 × 768) | Qmax1 | Q1 | Q2 | Q3 | Q4 |
| Galaxy Tab (1024 × 600) | Qmax2 | Q5 | Q6 | Q7 | Q8 |
| iPhone4 (960 × 640) | Qmax3 | Q9 | Q10 | Q11 | Q12 |
| iPhone 3GS (480 × 320) | — | Qmax4 | Q13 | Q14 | Q15 |

Table 1 shows an example on how to compute KQI1 for different video resolutions in pixels and different native screen resolutions in pixels, based on a look-up table. The values Qi and Qmaxi, where i is the index, in the table can either be arbitrarily set, or computed based on subjective user tests.

The parameter KQI2, the Session Normalized Play Time, indicates the total playtime normalized by the session duration. It requires the session total play time that is determined by DPI of the initial metadata from the video stream that states the video duration or by calculation of the downloaded session data divided by the video rate for those cases where the session is aborted before the end of the video is reached. Furthermore, it requires the information about the total perceived session duration. This KQI, being normalized, is always smaller or equal to 1. For the cases when the instantaneous network rate is much faster than the video rate, the user will still perceive the session duration as at least equal to the video playback duration. For cases when the user experiences video stalls during the video playback, the total session duration is larger than the actual length of the video.

Figure 7:
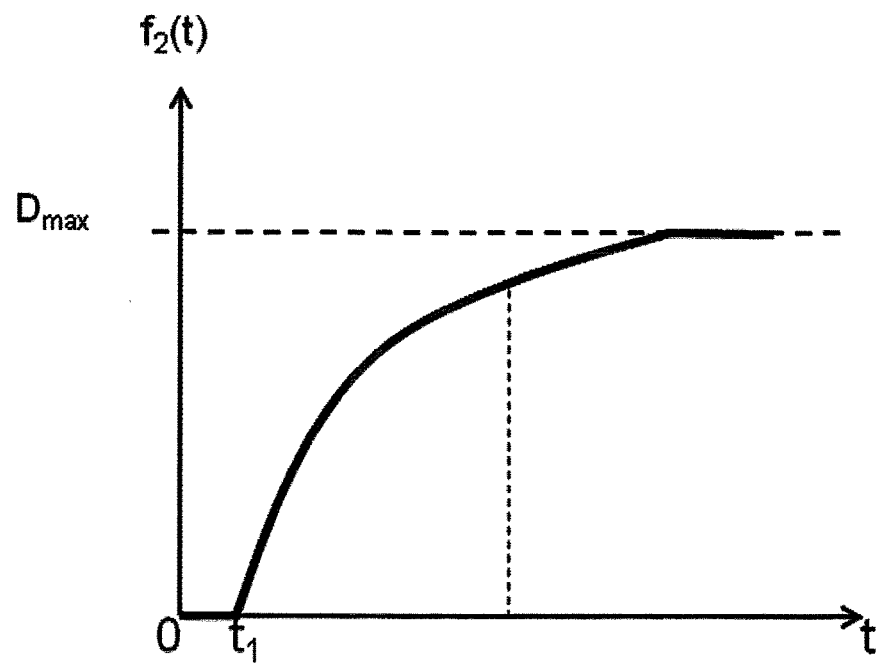
FIG. 7 shows a diagram of a model for the Session Stall Duration Degradation Factor according to an implementation form.

The parameter KQI3, the Session Stall Duration Degradation Factor ($f_2(t)$), is calculated as a function of the average Session Stall Duration, using the buffer model to determine session stall duration and frequency of occurrence as parameters. The function $$f_2(t) = \begin{cases} 0, & t \leq t_1 \\ \min(D_{max}, a \cdot \ln(b \cdot (1 + t - t_1))), & t > t_1 \end{cases}$$

is graphically illustrated in FIG. 7, wherein the variable t is the Session Duration (KQI25 in Table 3, see below). $D_{max}$ is the maximum degradation due to video stalling. Time t1 is the maximum average stalling time that will not affect the perceived quality. The variable t is the Average Stall Duration of the session (KQI25 in Table 3, see below). $D_{max}$ and t1 can either be arbitrarily set, or can be validated using subjective user tests. Parameter a and b can either be arbitrarily set, or can be validated using subjective user tests.

The parameter KQI4, the Session Normalized Total Stall Time indicates the cumulated stall time of the active session captured by the DPI and the buffer model normalized by the session duration. This KQI is smaller or equal to 1, and can be computed as KQI4=1−KQI2.

Figure 8:
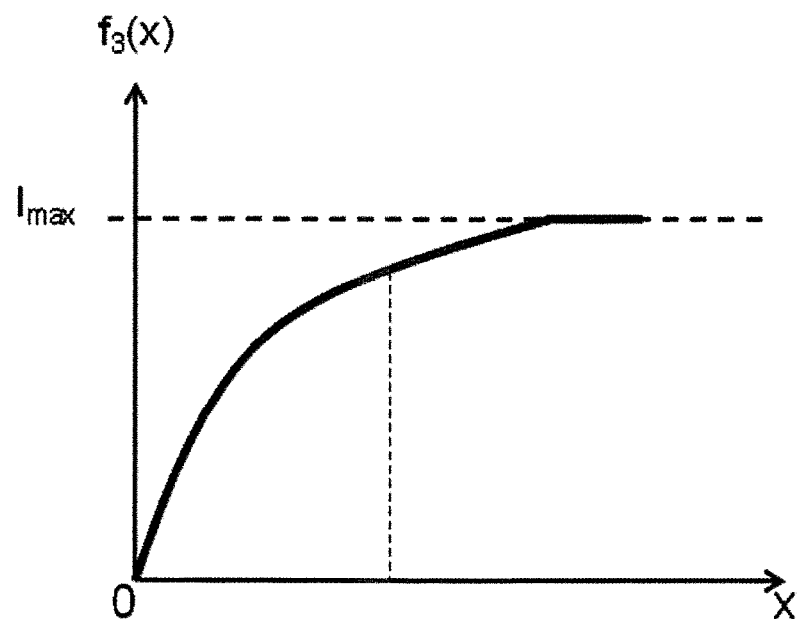
FIG. 8 shows a diagram of a model for the Session Number of Stalls Degradation Factor according to an implementation form.

The parameter KQI5, the Session Number of Stalls Degradation Factor ($f3(x)$) is calculated as a function of the average number of stalls during the active session. The function $$f_3(x) = \min[I_{max}, c \cdot \ln(d \cdot (1+x))]$$

is graphically illustrated in FIG. 8. Parameter Imax, c and d can either be arbitrarily set, or can be validated using subjective user tests. Variable x in the formula is the Normalized Number of Stalls for the given session (KQI 27 in Table 3, see below).

The ranges for the aforementioned parameters $D_{max}$ and $I_{max}$ may be obtained through subjective user validation tests. In general, the parameters take real values.

According to an implementation form, KQIs required for computation of QoE are presented in Tables 1, 2, 3 and 4.

TABLE 2

High level KQIs

| Quality Indicator | KQI Name | Description | Computation |
|---|---|---|---|
| KQI1 | Video Quality Matching Factor | Indicates the matching factor between the video stream quality and the device capabilities (function of display resolution and video resolution) for the active session | f1(KQI21, KQI22) |
| KQI2 | Session Normalized Play Time | Indicates the total play time of the active session normalized by the session duration | KQI23/KQI24 |
| KQI3 | Session Stall Duration Degradation Factor | Indicates the effect of the average stall time during the active session on the perceived quality (factor of total normalized stall time) | f2(KQI25) |
| KQI4 | Session Normalized Total Stall Time | Indicates the cumulated stall time of the active session normalized by the session duration | KQI26/KQI24 |
| KQI5 | Session Number of Stalls | Indicates the effect of average number of stalls during the active session on the | f3(KQI27) |

TABLE 2-continued

High level KQIs

| Quality Indicator | KQI Name | Description | Computation |
|---|---|---|---|
| | Degradation Factor | perceived quality | |
| QoEmin | Minimum perceived video Quality | Depending of the scale, could be 0-20 (on a 100 points scale), or 1 on a MOS scale | Fixed scalar |

TABLE 3

Intermediate Level KQIs

| Quality Indicator | KQI Name | Description | Computation |
|---|---|---|---|
| KQI21 | Device resolution | Indicates the maximum screen resolution of the device | Extracted from the device capabilities message |
| KQI22 | Encoding resolution | Indicates the resolution of the video in the active session | DPI on the video metadata (first packet of the video file) |
| KQI23 | Session Total Play Duration | Indicates the duration of the played video in active session | =KQI51 (Video Duration if no abort) =KQI52/KQI53 (session downloaded data/video bitrate if early abort) |
| KQI24 | Session Total Perceived Duration | Indicates the total time the users spends in the video playback | KQI23 + KQI26 |
| KQI25 | Session Average Stall Duration | Indicates the average duration of the stalls in the active session | KQI26/KQI54 |
| KQI26 | Session Total Stall Time | Indicates the cumulated stall time during the active session | Buffer model applied to the active session |
| KQI27 | Session Normalized Nr of Stalls | Indicates the number of stalls normalized to the session duration | KQI54/KQI24 |

TABLE 4

Low Level KQIs

| Quality Indicator | KQI Name | Description | Computation |
|---|---|---|---|
| KQI51 | Video Duration | Indicated the total duration of the video in the active session | DPI on the video metadata (first packet of the video file) |
| KQI52 | Session Downloaded Data | Indicates the total amount of video data downloaded in the active session | Process TCP ACKs during the session (Last TCP ACK Seq Nr-First TCP ACK Seq Nr) |
| KQI53 | Video bitrate | Indicates the average bitrate of the video in the active session | DPI on the video metadata (first packet of the video file) |
| KQI54 | Session Nr of Stalls | Indicates the number of stalls in the active session | Buffer model applied to the active session |

According to an implementation form, the determination unit estimates the average quality of the experience for video streaming for a given segment in the network. The estimate is based on average metrics, i.e. average KPIs, aggregated for the segment under consideration. According to an implementation form, the Quality of Experience (QoE) estimation for a segment of sessions calculates as follows.

QoE(segment)=max(QoEmin,KQI6*KQI7-KQI8*KQI9*KQI10), where the KQIs are defined as KQI6=Video Quality Matching Factor for the segment (f4( ), KQI7=Segment Normalized Play Time, KQI8=Segment Stall Duration Degradation Factor (f5( ),KQI9=Segment Average Normalized Total Stall Time, KQI10=Segment Average Number of Stalls Degradation Factor (f6( )).

The parameter KQI6, the Video Quality Matching Factor for the segment (f4( )), uses device screen resolution and video resolution as input parameters for the base quality calculation function. This function can be computed from the individual KQIs (KQI1) of the sessions in the given segment. It can be computed either as an average of these KQIs; as a minimum or other relevant function.

The parameter KQI7, the Segment Normalized Play Time, indicates the total playtime normalized by the average session duration for the segment. This KQI can be computed starting from the individual KQIs of the sessions in the segment, and the total number of sessions in the segment.

The parameter KQI8, the Segment Stall Duration Degradation Factor (f5( )), is calculated as a function of the average Session Stall Duration within the segment, using the buffer model to determine session stall duration and frequency of occurrence as parameters.

The parameter KQI9, the Segment Average Normalized Total Stall Time, indicates the average cumulated stall time of the active session normalized by the average session duration for the segment.

The parameter KQI10, the Segment Average Number of Stalls Degradation Factor (f6( )), is calculated as a function of the average number of stalls for the active sessions within the segment.

Functions f5 and f6 for the segment computation are the same as functions f2 and f3 presented before. However, the arguments taken as input by f5 and f6 are different than the arguments of f2 and f3, as presented above. Function f4 works as function f1, when the average result of the value for a segment can be computed by interpolation between the points presented in Table 1.

Tables 5 and 6 present implementation forms for computing the KQIs mentioned above.

TABLE 5

High Level KQIs

| Quality Indicator | KQI Name | Description | Computation |
| --- | --- | --- | --- |
| KQI6 | Video Quality Matching Factor for the segment | Indicates the matching factor between the video stream quality and the device capabilities (function of display resolution and video resolution) for the active sessions in the segment | Sum(KQI1)/KQI28 |
| KQI7 | Segment Average Normalized Play Time | Indicates the average play time of the sessions in the segment normalized by the average session duration for the segment | KQI30/KQI29 = Sum(KQI2)/KQI28 |
| KQI8 | Segment Stall Duration Degradation Factor | Indicates the effect of the average stall time of the sessions in the segment on the perceived quality (factor of total normalized stall time) | f2(KQI31) |
| KQI9 | Segment Average Normalized Stall Time | Indicates the average stall time of the sessions in the segment normalized by the average session duration for the segment | KQI32/KQI29 = Sum(KQI4)/KQI28 = 1 − KQI7 |
| KQI10 | Segment Average Number of Stalls Degradation Factor | Indicates the effect of the average number of stalls for the sessions in the segment on the perceived quality | f3(KQI33) |
| QoEmin | Minimum perceived video Quality | Depending of the scale, could be 0-20 (on a 100 points scale), or 1 on a MOS scale | Fixed scalar |

TABLE 6

Intermediate Level KQIs

| Quality Indicator | KQI Name | Description | Computation |
| --- | --- | --- | --- |
| KQI28 | Nr. Sessions in Segment | Indicates the number of sessions belonging to one segment | Session counter incremented by applying segment filters to observed sessions |
| KQI29 | Segment Average Session Perceived Duration | Indicates the average session duration of a segment | Sum(KQI24)/KQI28 |
| KQI30 | Segment Average Session Play Duration | Indicates the average session play duration of a segment | Sum(KQI23)/KQI28 |
| KQI31 | Segment Average Stall Duration | | Sum(KQI25)/KQI28 |
| KQI32 | Segment Average Session Stall Time | Indicates the average session stall duration of a segment | Sum(26)/KQI28 |
| KQI33 | Segment Average Nr of Stalls | Indicates the average number of stalls for the sessions in the segment | Sum(KQI27)/KQI28 |

What is claimed is:
1. A monitoring device for monitoring a video session in a data network between a video server providing a video file and a video client playing the video file, the device comprising:

a data interface configured to connect to an end-to-end communication path between the video server and the video client and configured to capture video resolution information and to retrieve client screen resolution information; and a determination unit configured to determine a quality measure for the video session based on the video resolution information, based on the client screen resolution information and based on a buffer model, the buffer model modeling a fill level of a receive buffer in the video client, the receive buffer being configured to buffer the video file before playing the video file.

2. The monitoring device of claim 1, wherein the data interface comprises a first interface unit for capturing the video resolution information, and a second interface unit for retrieving the client screen resolution information from a network node over a communication network.

3. The monitoring device of claim 1, wherein the data interface is configured to capture the video resolution information from a video file meta data associated to the video file.

4. The monitoring device of claim 1, wherein the client screen resolution information indicates a native resolution of a display of the video client, and wherein the video resolution information indicates an encoding resolution of the video file.

5. The monitoring device of claim 1, wherein the quality measure depends on a Video Quality Matching Factor which is determined as a correlation of a video resolution of the video file included in the video resolution information and a maximum screen resolution of a display of the video client included in the client capabilities information.

6. The monitoring device of claim 1, wherein the quality measure depends on a Session Normalized Play Time which is determined as a total play time of the video session normalized by a duration of the video session.

7. The monitoring device of claim 1, wherein the quality measure depends on a Session Stall Duration Degradation Factor which is determined as a function of an average stall duration of the video session, using the buffer model to determine the stall duration of the video session and a frequency of occurrence of the stalls of the video session.

8. The monitoring device of claim 1, wherein the quality measure depends on a Session Normalized Total Stall Time which is determined as a cumulated time of stalls of the video session normalized by a duration of the video session.

9. The monitoring device of claim 1, wherein the quality measure depends on a Session Number of Stalls Degradation Factor which is determined as a function of an average number of stalls during the video session.

10. The monitoring device of claim 5, wherein the quality measure QoE depends on a formula:

$$QoE=\max(QoEmin, KQI1*KQI2*KQI3*KQI4*KQI5),$$

wherein QoEmin is a minimum limit of the quality measure, KQI1 is the Video Quality Matching Factor, KQI2 is the Session Normalized Play Time, KQI3 is the Session Stall Duration Degradation Factor, KQI4 is the Session Normalized Total Stall Time and KQI5 is the Session Number of Stalls Degradation Factor.

11. The monitoring device of claim 1, wherein the buffer model depends on an instantaneous network rate $r(t)$ computed by following messages between the video client and the video server and wherein the buffer model depends on a video rate $v(t)$ captured from meta data of packets of the video file.

12. The monitoring device of claim 1, wherein the data interface is configured to retrieve the client screen resolution information by signalling through the data network or by correlating device capabilities information available in network management systems and databases of the data network.

13. The monitoring device of claim 1, wherein the determination unit is configured to determine one quality measure for a group of video sessions representing an average quality for the group of video sessions.

14. The monitoring device of claim 13, wherein the group of video sessions comprises video sessions between one video server and multiple video clients, multiple video sessions between one video server and one video client and video sessions between multiple video servers and multiple video clients.

15. The monitoring device of claim 1, wherein the data network is a TCP/IP network and the data interface is configured to connect to the TCP layer of the TCP/IP network.

16. The monitoring device of claim 1, wherein the data interface is an element of a video server, of the video client, of an intermediate network node, or of an additional intermediate network node placed in the end-to-end communication path of the data network.

17. A method for monitoring a video session in a data network between a video server providing a video file and a video client playing the video file, the method comprising:

connecting to an end-to-end communication path between the video server and the video client and capturing video resolution information and retrieving client screen resolution information; and determining a quality measure for the video session based on the video resolution information, based on the client screen resolution information and based on a buffer model, the buffer model modeling a fill level of a receive buffer in the video client, the receive buffer being configured to buffer the video file before playing the video file.

18. A computer program product for monitoring a video session in a data network between a video server providing a video file and a video client playing the video file, the computer program product comprising non-transitory computer readable medium having instructions to:

connect to an end-to-end communication path between the video server and the video client and configured to capture video resolution information and to retrieve client screen resolution information; and determine a quality measure for the video session based on the video resolution information, based on the client screen resolution information and based on a buffer model, the buffer model modeling a fill level of a receive buffer in the video client, the receive buffer being configured to buffer the video file before playing the video file.

19. The computer program product of claim 18, wherein the instructions are configured as a terminal agent software in an end user device or as a network probe on a network interface.

* * * * *